(12) United States Patent
Kimura et al.

(10) Patent No.: US 7,995,158 B2
(45) Date of Patent: Aug. 9, 2011

(54) LIQUID CRYSTAL DISPLAY APPARATUS

(75) Inventors: Kiyohiro Kimura, Miyagi (JP); Makoto Aoki, Miyagi (JP); Jun Sasaki, Miyagi (JP); Toru Abiko, Miyagi (JP)

(73) Assignee: Sony Corporation, Tokyo (JP)

( * ) Notice: Subject to any disclaimer, the term of this patent is extended or adjusted under 35 U.S.C. 154(b) by 156 days.

(21) Appl. No.: 11/920,886

(22) PCT Filed: Mar. 29, 2007

(86) PCT No.: PCT/JP2007/056793
§ 371 (c)(1),
(2), (4) Date: Aug. 29, 2008

(87) PCT Pub. No.: WO2007/119584
PCT Pub. Date: Oct. 25, 2007

(65) Prior Publication Data
US 2009/0079905 A1 Mar. 26, 2009

(30) Foreign Application Priority Data
Mar. 29, 2006 (JP) ................ P2006-090709

(51) Int. Cl.
*G02F 1/1335* (2006.01)
(52) U.S. Cl. ............... 349/62; 349/64; 349/65
(58) Field of Classification Search ............. 349/57, 349/62–65
See application file for complete search history.

(56) References Cited

U.S. PATENT DOCUMENTS

| | | | | |
|---|---|---|---|---|
| 5,798,805 A | * | 8/1998 | Ooi et al. | 349/10 |
| 6,091,547 A | * | 7/2000 | Gardiner et al. | 359/625 |
| 2001/0035924 A1 | * | 11/2001 | Fujieda | 349/65 |
| 2003/0160917 A1 | * | 8/2003 | Takahashi et al. | 349/113 |

FOREIGN PATENT DOCUMENTS

| | | |
|---|---|---|
| JP | 08-036179 | 2/1996 |
| JP | 2004-046076 | 2/2004 |
| JP | 2005-234538 | 9/2005 |
| JP | 10-506500 | 6/2007 |
| WO | WO 96/10148 | 4/1996 |

* cited by examiner

*Primary Examiner* — David Nelms
*Assistant Examiner* — David Y Chung
(74) *Attorney, Agent, or Firm* — Wolf, Greenfield & Sacks, P.C.

(57) ABSTRACT

A liquid crystal display apparatus is provided in which occurrence of a moiré pattern can be prevented without largely reducing front luminance. A liquid crystal display apparatus 1 includes a surface light source 4, a liquid crystal display panel 2, and first and second prism sheets 5 and 6 for condensing light emitted from the surface light source 4 and guiding the light toward the liquid crystal display panel. The first and second prism sheets 5 and 6 are disposed such that prism array directions thereof are orthogonal to each other. When a pixel pitch of the liquid crystal display panel 2 is defined as Pp [μm]; a prism array pitch of the first prism sheet 5 is defined as Px [μm]; and a prism array pitch of the second prism sheet 6 is defined as Py [μm], relationships of $Px \leq Pp/(14-0.045 Pp)$ and $Py \leq Pp/(11.5-0.032 Pp)$ are satisfied.

15 Claims, 6 Drawing Sheets

FIG. 2

PIXEL PITCH = 222μm

PRISM ARRAY PITCH Px[μm]

| PRISM ARRAY PITCH Py[μm] | 50 | 19 | 14 | 10 | 5 |
|---|---|---|---|---|---|
| 50 | 0○ | -31○ | -36○ | -40○ | -45○ |
| 19 | 31○ | 0○ | -5○ | -9○ | -14○ |
| 14 | 36○ | 5○ | 0○ | -4○ | -9○ |
| 10 | 40○ | 9○ | 4○ | 0○ | -5○ |
| 5 | 45○ | 14○ | 9○ | 5○ | 0○ |

FIG. 3

PIXEL PITCH = 144μm

PRISM ARRAY PITCH Px[μm]

| PRISM ARRAY PITCH Py[μm] | 50 | 19 | 14 | 10 | 5 |
|---|---|---|---|---|---|
| 50 | 0× | -31× | -36× | -40× | -45× |
| 19 | 31× | 0○ | -5○ | -9○ | -14○ |
| 14 | 36× | 5○ | 0○ | -4○ | -9○ |
| 10 | 40× | 9○ | 4○ | 0○ | -5○ |
| 5 | 45× | 14○ | 9○ | 5○ | 0○ |

FIG. 4

PIXEL PITCH = 136.5 μm

PRISM ARRAY PITCH Px[μm]

| PRISM ARRAY PITCH Py[μm] | 50 | 19 | 14 | 10 | 5 |
|---|---|---|---|---|---|
| 50 | 0× | -31× | -36× | -40× | -45× |
| 19 | 31× | 0× | -5○ | -9○ | -14○ |
| 14 | 36× | 5× | 0○ | -4○ | -9○ |
| 10 | 40× | 9× | 4○ | 0○ | -5○ |
| 5 | 45× | 14× | 9○ | 5○ | 0○ |

FIG. 5

| PRISM ARRAY PITCH Py | PRISM ARRAY PITCH Px (cd/m2) | | | |
|---|---|---|---|---|
| | 50 μm | 19 μm | 14 μm | 10 μm |
| 50 μm | 2751 | 2449 | 2390 | 2279 |
| 19 μm | 2473 | 2294 | 2190 | 2127 |
| 14 μm | 2430 | 2212 | 2136 | 2054 |
| 10 μm | 2343 | 2140 | 2075 | 1986 |

▬ : PIXEL PITCH = 222 μm
▬ : PIXEL PITCH = 144 μm
▫ : PIXEL PITCH = 136.5 μm

LIQUID CRYSTAL DISPLAY APPARATUS

TECHNICAL FIELD

The present invention relates to a liquid crystal display apparatus including a light-transmissive condenser sheet, and more particularly to a liquid crystal display apparatus including a first condenser sheet and a second condenser sheet that are arranged in a stack.

BACKGROUND ART

Liquid crystal display (LCD) apparatuses have a lower power consumption and can be made smaller and thinner than cathode-ray-tube (CRT) apparatuses. Nowadays, various sizes of liquid crystal display apparatuses are widely used, ranging from small apparatuses such as mobile phones and digital cameras to large apparatuses such as large liquid crystal televisions.

Liquid crystal display apparatuses are classified into a transmissive type, a reflective type, and the like. Particularly, a transmissive liquid crystal display apparatus includes a liquid crystal display panel constituted by a pair of transparent substrates with a liquid crystal layer therebetween and a backlight unit serving as an illumination light source. Backlight units are classified into a direct-lighting type, in which a light source is provided directly under a liquid crystal display panel, and an edge-lighting type.

In general, a backlight unit for liquid crystal display apparatuses employs a condenser sheet, such as a prism sheet, a lens sheet, or the like, for orienting light emitted from a light source toward the front.

For example, a prism sheet includes a number of prisms each having a triangular cross section on a light-output surface thereof. The prism sheet condenses and orients light incident thereon toward the front by refracting and transmitting the incident light through inclined planes of the prisms. Particularly, for use in mobile apparatuses, an exemplary structure is known in which two prism sheets are arranged in a stack such that respective prism arrays of the two sheets are oriented orthogonally to each other, whereby light spreading in the two directions are efficiently condensed to improve front luminance (refer to Patent Document 1 below).

[Patent Document 1] PCT Japanese Translation Patent Publication No. 10-506500

DISCLOSURE OF THE INVENTION

Problem to be Solved by the Invention

A contrast pattern (moiré pattern) may occur due to interference depending on the prism array pitch of a prism sheet and the pixel array pitch of a liquid crystal display panel. In order to prevent the occurrence of such a moiré pattern, it is effective to reduce the prism array pitch.

However, there is a problem in that simply reducing the prism array pitch may considerably reduce the front luminance and, consequently, degrade the image quality. The same problem applies to the case where two prism sheets are arranged in a stack, as described above.

In view of the above problem, the present invention aims to provide a liquid crystal display apparatus in which occurrence of a moiré pattern can be prevented without largely reducing front luminance.

Means for Solving the Problem

In solving the above problem, the inventors have found that a liquid crystal display apparatus causing no moiré pattern can be produced, while reduction of front luminance is minimized, by determining the optimum combination of prism array pitches of prism sheets in accordance with the pixel pitch of a liquid crystal display panel.

That is, a liquid crystal display apparatus according to the present invention includes a light source, a liquid crystal display panel, and condenser sheets for condensing light emitted from the light source and guiding the light toward the liquid crystal display panel. The condenser sheets include a first condenser sheet in which ridges of a first corrugated structure having a light-condensing characteristic are periodically arranged on one surface the first condenser sheet in a longitudinal direction of the liquid crystal display panel, and a second condenser sheet in which ridges of a second corrugated structure having a light-condensing characteristic are periodically arranged on one surface the of the second condenser sheet in a lateral direction of the liquid crystal display panel. When a pixel pitch of the liquid crystal display panel is defined as Pp [μm], an array pitch of the first corrugated structure is defined as Px [μm], and an array pitch of the second corrugated structure is defined as Py [μm], the following relationships are satisfied:

$Px \leq Pp/(14-0.045Pp)$, and $Py \leq Pp/(11.5-0.032Pp)$.

As described above, by determining the array pitches of the respective corrugated structures of the first and second condenser sheets in accordance with the pixel pitch of the liquid crystal display panel, occurrence of a moiré pattern can be prevented without largely reducing front luminance of the liquid crystal display panel.

Preferably, $Px \leq 50$, $Py \leq 50$, and $|Px-Py| < 50$ are satisfied when $Pp \geq 222$; $Px \leq 20$, $Py \leq 20$, and $|Px-Py| < 20$ are satisfied when $222 > Pp \geq 144$; and $Px \leq 15$, $Py \leq 20$, and $-20 < Px-Py < 15$ are satisfied when $114 > Pp \geq 136.5$.

The first and second corrugated structures correspond to prism structures having ridges of a triangular shape in cross section if the condenser sheets are prism sheets. If the condenser sheets are lens sheets, the first and second corrugated structures have ridges of a lens shape, such as an aspheric lens, with a curved cross section.

Advantages of the Invention

As described above, according to the liquid crystal display apparatus of the present invention, occurrence of a moiré pattern can be prevented without largely reducing front luminance.

BRIEF DESCRIPTION OF THE DRAWINGS

FIG. 2 is a diagram showing occurrence of a moiré pattern in various combinations of prism array pitches Px and Py when the pixel pitch is 222 μm.

FIG. 3 is a diagram showing occurrence of a moiré pattern in various combinations of prism array pitches Px and Py when the pixel pitch is 144 μm.

FIG. 4 is a diagram showing occurrence of a moiré pattern in various combinations of prism array pitches Px and Py when the pixel pitch is 136.5 μm.

FIG. 5 is a diagram showing values of front luminance in various combinations of prism array pitches Px and Py.

BEST MODE FOR CARRYING OUT THE INVENTION

An embodiment of the present invention will now be described with reference to the drawings. The invention is not limited to the following embodiment, and various modifications can be made within the scope of the invention.

Figure 1:
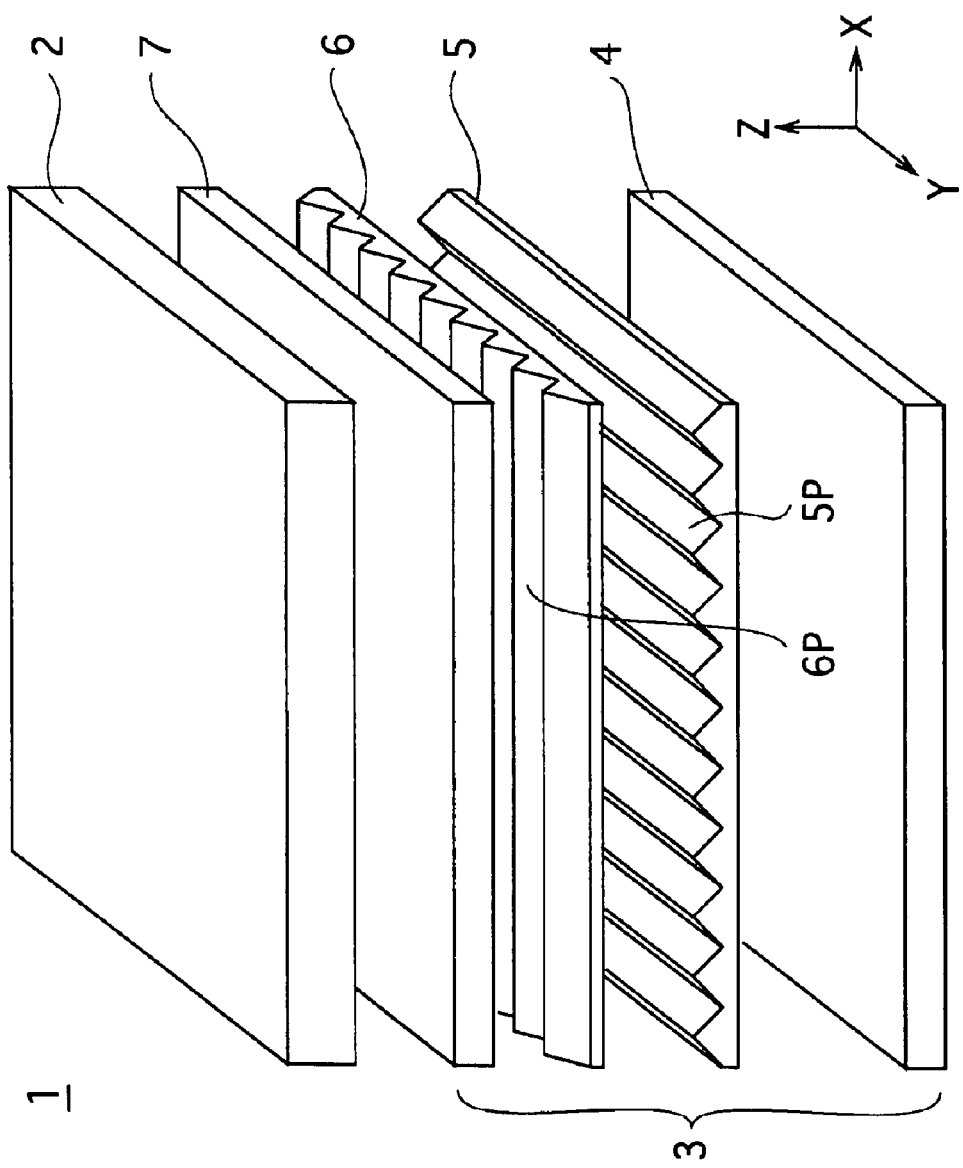
FIG. 1 is an exploded perspective view showing the schematic structure of a liquid crystal display apparatus according to an embodiment of the present invention.

FIG. 1 is an exploded perspective view showing the schematic structure of a liquid crystal display apparatus 1 according to an embodiment of the present invention. The liquid crystal display apparatus 1 in the figure includes a liquid crystal display panel 2 and a backlight unit 3. The backlight unit 3 includes a surface light source 4, a first prism sheet 5, a second prism sheet 6, and a diffusion plate 7 arranged in that order.

The liquid crystal display panel 2 includes pixels arranged in the longitudinal direction (X-direction in FIG. 1) and the lateral direction (Y-direction in FIG. 1) thereof at a predetermined pitch, and displays a predetermined image on the front surface thereof by controlling the transmittance of light applied from the backlight unit 3 for each of the pixels. The image displayed is a color image but not limited thereto, of course. The liquid crystal display panel 2 includes a liquid crystal cell constituted by a pair of transparent substrates facing each other with a liquid crystal layer provided therebetween, a pair of polarizing plates sandwiching the liquid crystal cell, and the like. The liquid crystal material constituting the liquid crystal layer is not particularly limited but is appropriately selected according to the method for driving liquid crystal, such as the TN method, the VA method, or the like.

The surface light source 4 is either a direct-lighting type in which a plurality of light sources are disposed on a surface or an edge-lighting type in which a light-guiding plate is used. The surface light source 4 irradiates the entire back surface of the liquid crystal display panel 2 with backlight. As the light sources, linear light sources such as fluorescent tubes or point light sources such as light-emitting diodes are used.

The first and second prism sheets 5 and 6 serve as "condenser sheets" of the invention for condensing light emitted from the surface light source 4 toward the front (in the Z-direction) so as to improve front luminance. The diffusion plate 7 is an optically functional element for diffusing and delivering the backlight so as to produce uniform luminance. The diffusion plate 7 may be provided between the first prism sheet 5 and the surface light source 4. Optically functional elements other than the first and second prism sheets 5, 6, and the diffusion plate 7 may also be provided, such as a polarization separation element that transmits one polarized component and reflects another polarized component, for example.

Each of the first and second prism sheets 5 and 6 is provided with a prism structure having ridges of a triangular shape in cross section on a light-output surface thereof. The prism structure correspond to a "corrugated structure" of the present invention.

On the first prism sheet 5, prisms 5P are arranged successively at a predetermined pitch in the longitudinal direction of the liquid crystal display panel 2 (the X-direction in FIG. 1). On the second prism sheet 6, prisms 6P are arranged successively at a predetermined pitch in the lateral direction of the liquid crystal display panel 2 (the Y-direction in FIG. 1). In this embodiment, cross sections of the prisms 5P and the prisms 6P are both isosceles triangles each having a vertex angle of 90°.

The first prism sheet 5 condenses light spreading in the X-direction, among the backlight emitted from the surface light source 4, toward the Z-direction. The second prism sheet 6 condenses light spreading in the Y-direction toward the Z-direction. Since the light spreading in the X- and Y-directions are condensed toward the front (in the Z-direction) by the first and second prism sheets 5 and 6, front luminance of the liquid crystal display apparatus 1 is more improved than in the case where only one prism sheet is provided.

The prism array pitch of the first prism sheet 5 and the prism array pitch of the second prism sheet 6 may be either the same or different. In general, the smaller the prism array pitch is, the lower the resultant front luminance becomes. Moreover, a moiré pattern of interference fringes may occur due to the periodic structures provided on the first and second prism sheets 5 and 6 and the display pixels provided on the liquid crystal display panel 2. The occurrence of such a moiré pattern can be prevented by reducing the prism array pitches of the first and second prism sheets 5 and 6. However, if the prism array pitches are excessively reduced, front luminance will be reduced considerably.

Hence, the liquid crystal display apparatus 1 of this embodiment is configured so that, when the pixel pitch of the liquid crystal display panel 2 is defined as Pp [μm], the prism array pitch of the first prism sheet 5 is defined as Px [μm], and the prism array pitch of the second prism sheet 6 is defined as Py [μm], the following relationships are satisfied:

$$Px \leq Pp/(14-0.045Pp), \text{ and}$$

$$Py \leq Pp/(11.5-0.032Pp) \quad (1)$$

By setting the first prism array pitch Px and the second prism array pitch Py in accordance with the pixel pitch Pp of the liquid crystal display panel 2 so as to satisfy the above expression (1), a liquid crystal display apparatus in which occurrence of a moiré pattern can be prevented without largely reducing front luminance can be obtained.

For example, when the pixel pitch Pp is 222 μm, the upper limits of Px and Py are about 55 μm and 56 μm, respectively; when the pixel pitch is 144 μm, the upper limits of Px and Py are about 19 μm and about 20 μm, respectively; and when the pixel pitch is 136.5 μm, the upper limits of Px and Py are about 17 μm and 19 μm, respectively.

Preferably, in the case of Pp≧222, Px≦50, Py≦50, and |Px−Py|<50 are satisfied; in the case of 222>Pp≧144, Px≦20, Py≦20, and |Px−Py|<20 are satisfied; and in the case of 144>Pp≧136.5, Px≦15, Py≦20, and −20<Px−Py<15 are satisfied.

FIGS. 2 to 4 show the results of an experiment for checking occurrence of a moiré pattern for each of combinations of the prism array pitches of the first and second prism sheets 5 and 6 when the pixel pitches (Pp) of the liquid crystal display panel 2 are 222 μm, 144 μm, and 136.5 μm, respectively. In each of the figures, numbers in the table indicate the value of "Px−Py", a symbol "O" indicates that no moiré pattern occurred, and a symbol "x" indicates that a moiré pattern occurred. The occurrence of a moiré pattern was examined visually.

Referring to FIG. 2, in the case of the 222 μm pixel pitch, it was found that no moiré pattern occurred in all the combinations where the prism array pitches Px and Py of the first and second prism sheets 5 and 6 are 50 μm or less. In contrast, referring to FIG. 3, in the case of the 144 μm pixel pitch, occurrence of a moiré pattern could be prevented only in the combinations where Px and Py are both 19 μm or less. Further, in the case of the 136.5 μm pixel pitch, occurrence of a moiré pattern could be prevented only in the combinations of Px$\leq$14 μm and Py$\leq$19 μm.

As described above, by setting the pixel pitch Pp of the liquid crystal display panel 2 and the prism array pitches Px and Py of the first and second prism sheets 5 and 6 so as to satisfy the relationships of the expression (1), the liquid crystal display apparatus 1 causing no moiré pattern can be obtained.

FIG. 5 shows exemplary combinations of the prism array pitches Px and Py (50 μm, 19 μm, 14 μm, and 10 μm) of the first and second prism sheets 5 and 6 and values of front luminance in those combinations. Front luminance is expressed as the measured luminance of light transmitted through the prism sheets 5 and 6. In FIG. 5, the ranges of the above-mentioned combinations of the prism pitches Px and Py where no moiré pattern occurred are indicated by rectangles of different lines for the cases of the pixel pitches of 222 μm, 144 μm, and 136.5 μm.

As shown in FIG. 5, it is understood that combinations of larger prism array pitches Px and Py produce higher front luminance. Further, by referring to the exemplary combinations in FIG. 5, the optimum selection for the prism sheets 5 and 6 capable of preventing reduction of front luminance caused by reduction of the prism pitches can be made in accordance with the pixel pitch of the liquid crystal display panel 2 to be used.

Thus, according to this embodiment, the array pitches of the respective prisms 5P and 6P on the first and second prism sheets 5 and 6 are determined in accordance with the pixel pitch of the liquid crystal display panel 2 as shown in the expression (1). Accordingly, occurrence of a moiré pattern can be prevented, without largely reducing front luminance of the liquid crystal display panel.

Furthermore, since the upper limits of the prism array pitches Px and Py producing a high front luminance without causing a moiré pattern can be obtained easily according to the expression (1), the combination of the prism sheets 5 and 6 can be optimized and the degree of design flexibility can also be improved.

Next, detailed configurations of the first and second prism sheets 5 and 6 and modifications thereof will be described below.

Each of the first and second prism sheets 5 and 6 is configured to have a prism structure on one surface of a base film made of light-transmissive resin such as polyethylene terephthalate (PET) or polycarbonate (PC). The prism structure may be directly formed on the base film by a method such as casting or melt extrusion. Alternatively, a surface having the shape of the prism structure may be formed using an ultraviolet-curable resin material and then be transferred onto the surface of the base film.

In an exemplary configuration in which the prism structure is transferred onto the base film, the prism sheet can be made thinner by configuring the prism structure to be later separable from the base film. Specifically, the thickness of the prism sheet can be made thinner in the following manner, for example: the thickness of a 50-μm-pitch prism sheet becomes 50 μm, the thickness of a 19-μm-pitch prism sheet becomes 35 μm, the thickness of a 14-μm-pitch prism sheet becomes 32 μm, and the thickness of a 10-μm-pitch prism sheet becomes 30 μm.

Figure 6:
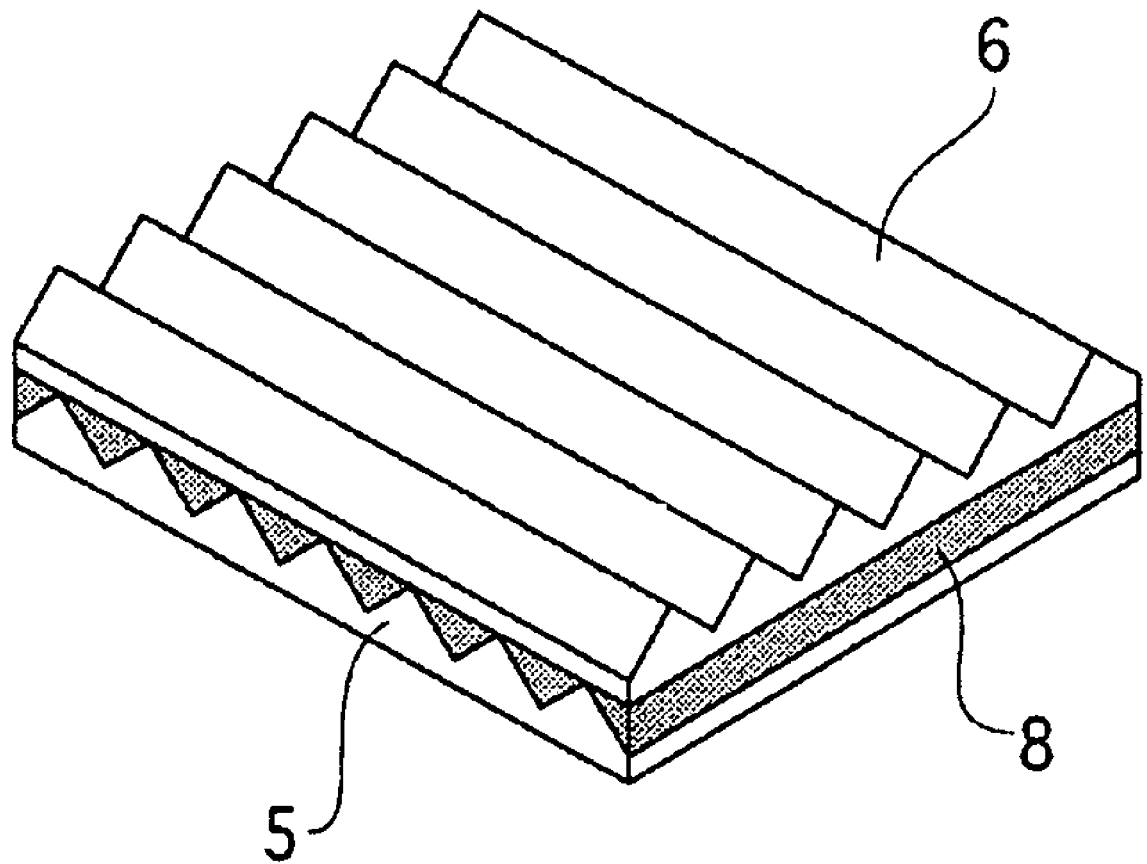
FIG. 6 is a schematic perspective view showing an exemplary structure in which a first prism sheet and a second prism sheet are combined together with an adhesive layer therebetween.

If usability of the first and second prism sheets is expected to be degraded because of such thinning, the first and second prism sheets 5 and 6 may be bonded together with an adhesive layer 8 therebetween, as shown in FIG. 6. The adhesive layer 8 is preferably made of a material having a refractive index lower than those of the first and second prism sheets 5 and 6. For example, when the prism sheets 5 and 6 are made of polycarbonate having a refractive index of about 1.6, the adhesive layer 8 can be formed of an acrylic ultraviolet-curable resin having a refractive index of about 1.3 to 1.4.

The liquid crystal display apparatus 1 having an improved front luminance can be obtained by employing two prism sheets including the first and second prism sheets 5 and 6 as shown in FIG. 1. In this case, the vertex angle of each of the prisms 5P of the first prism sheet 5 provided on the lower position and the vertex angle of each of the prisms 6P of the second prism sheet 6 provided on the upper position are not necessarily the same, but may be different. For example, when the vertex angle of each of the prisms 6P is set larger than that of each of the prisms 5P, the viewing angle can be widened.

In the case where a single pixel includes sub-pixels having colors of R, G, and B as in the case of a color liquid crystal display panel, the prism array pitch Px of the first prism sheet 5 having the prisms 5P arranged in the longitudinal direction (X-direction) of the screen may be set to one-third of the prism array pitch Py of the second prism sheet 6 having the prisms 6P arranged in the lateral direction (Y-direction) of the screen.

Figure 7:
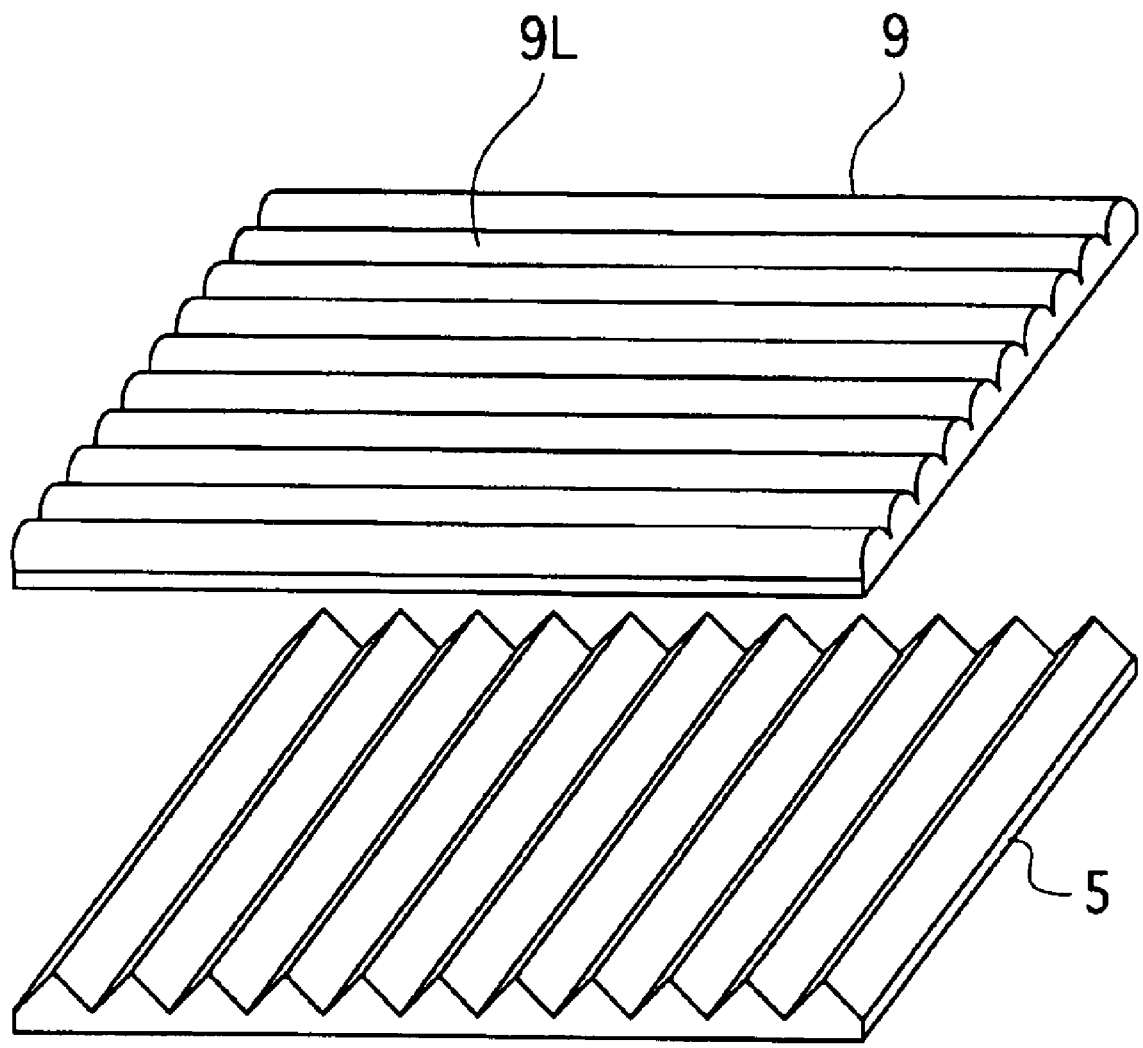
FIG. 7 is a schematic perspective view showing an exemplary combination of a first condenser sheet constituting a prism sheet and a second condenser sheet constituting a lens sheet.

The condenser sheets according to the present invention are not limited to the above-described prism sheets 5 and 6. FIG. 7 illustrates an example in which the first condenser sheet is formed of the first prism sheet 5 and the second condenser sheet is formed of a lens sheet 9. The lens sheet 9 includes a number of cylindrical lenses 9L each having, for example, an aspheric cross section successively arranged in one direction on a light-output surface thereof. In this example, the cylindrical lenses 9L are arranged in a crosswise direction relative to the direction in which the prisms 5P are arranged (orthogonal to the direction in which the prisms 5P are arranged in the figure).

Also in this example, by setting the pixel pitch Pp of the liquid crystal display panel, the prism array pitch Px of the prism sheet 5, and a lens array pitch Py of the lens sheet 9 so as to satisfy the relationships of the expression (1), the advantages of the invention can be obtained. Further, by placing the lens sheet 9 on the upper position, a liquid crystal display apparatus having a wider viewing angle can be produced. Also when the first and second condenser sheets are both lens sheets, the same advantages as those described above can be obtained.

The invention claimed is:

1. A liquid crystal display apparatus comprising:
a light source;
a liquid crystal display panel;
and condenser sheets for condensing light emitted from the light source and guiding the light toward the liquid crystal display panel,
the condenser sheets including:
a first condenser sheet in which ridges of a first corrugated structure having a first light-condensing characteristic are periodically arranged on one surface of the first condenser sheet in a longitudinal direction of the liquid crystal display panel; and
a second condenser sheet in which ridges of a second corrugated structure having a second light-condensing characteristic are periodically arranged on one surface of the second condenser sheet in a lateral direction of the liquid crystal display panel, wherein, when a longitudinal, lateral, or sub-pixel pitch of the liquid crystal display panel is defined as Pp, an array pitch of the first corrugated structure is defined as Px, and an array pitch of the second corrugated structure is defined as Py, the following relationships are satisfied: Px is approximately equal to Pp/(14−0.045Pp) and Py is approximately equal to Pp/(11.5−0.032Pp) such that moiré patterns are not produced by the condenser sheets and the liquid crystal display panel, and the condenser sheets do not significantly reduce the luminance from the liquid crystal display.

2. The liquid crystal display apparatus according to claim 1, wherein each of the first and second corrugated structures is a prism structure having ridges of a triangular shape in cross section.

3. The liquid crystal display apparatus according to claim 1, wherein at least one of the ridges of the first corrugated structure or the ridges of the second corrugated structure have a shape of an aspheric lens.

4. The liquid crystal display apparatus according to claim 1, wherein Px≦50, Py≦50, and |Px−Py|<50 are satisfied when Pp≧222.

5. The liquid crystal display apparatus according to claim 1, wherein Px≦20, Py≦20, and |Px−Py|<20 are satisfied when 222>Pp≧144.

6. The liquid crystal display apparatus according to claim 1, wherein Px≦15, Py≦20, and −20<Px−Py<15 are satisfied when 114>Pp≧136.5.

7. The liquid crystal display apparatus according to claim 1, wherein Px is slightly less than or equal to Pp/(14−0.045Pp) and Py is slightly less than or equal to Pp/(11.5−0.032Pp).

8. A liquid crystal display apparatus comprising:
a liquid crystal display panel; and
condenser sheets for condensing light emitted from a light source and guiding the light toward the liquid crystal display panel,
the condenser sheets including:
a first condenser sheet in which ridges of a first corrugated structure having a first light-condensing characteristic are periodically arranged on one surface of the first condenser sheet in a longitudinal direction of the liquid crystal display panel; and
a second condenser sheet in which ridges of a second corrugated structure having a second light-condensing characteristic are periodically arranged on one surface of the second condenser sheet in a lateral direction of the liquid crystal display panel, wherein, when a longitudinal, lateral, or sub-pixel pitch of the liquid crystal display panel is defined as Pp, an array pitch of the first corrugated structure is defined as Px, and an array pitch of the second corrugated structure is defined as Py, the following relationships are satisfied: Px is approximately equal to Pp/(14−0.045Pp) and Py is approximately equal to Pp/(11.5−0.032Pp) such that moiré patterns are not produced by the condenser sheets and the liquid crystal display panel, and the condenser sheets do not significantly reduce the luminance from the liquid crystal display.

9. The liquid crystal display apparatus according to claim 8 incorporated in a device selected from the following group: a mobile phone, a digital camera, a liquid crystal television.

10. The liquid crystal display apparatus according to claim 8, wherein each of the first and second corrugated structures is a prism structure having ridges of a triangular shape in cross section.

11. The liquid crystal display apparatus according to claim 8, wherein at least one of the ridges of the first corrugated structure or the ridges of the second corrugated structure have a shape of an aspheric lens.

12. The liquid crystal display apparatus according to claim 8, wherein Px≦50, Py≦50, and |Px−Py|<50 are satisfied when Pp≧222.

13. The liquid crystal display apparatus according to claim 8, wherein Px≦20, Py≦20, and |Px−Py|<20 are satisfied when 222>Pp≧144.

14. The liquid crystal display apparatus according to claim 8, Wherein Px≦15, Py≦20, and −20<Px−Py<15 are satisfied when 114>Pp≧136.5.

15. The liquid crystal display apparatus according to claim 8, wherein Px is slightly less than or equal to Pp/(14−0.045Pp) and Py is slightly less than or equal to Pp/(11.5−0.032Pp).

* * * * *